United States Patent [19]

Forbus et al.

[11] Patent Number: 5,342,443
[45] Date of Patent: Aug. 30, 1994

[54] METHOD FOR BLEACHING KAOLIN CLAY

[75] Inventors: Ellen S. Forbus, Macon; George E. Gantt, Milledgeville; Mitchell J. Willis; Raymond H. Young, both of Macon, all of Ga.

[73] Assignee: Engelhard Corporation, Iselin, N.J.

[21] Appl. No.: 43,249

[22] Filed: Apr. 6, 1993

[51] Int. Cl.$^5$ .............................. C04B 14/04
[52] U.S. Cl. ................... 106/488; 106/401; 106/416; 501/141; 501/145; 501/146
[58] Field of Search ............... 106/416, 488, 401; 501/141, 145, 146

[56] References Cited

U.S. PATENT DOCUMENTS

| | | |
|---|---|---|
| 3,290,161 | 6/1966 | Sheldon et al. . |
| 3,353,668 | 11/1967 | Duke . |
| 3,489,586 | 1/1970 | Chapman et al. . |
| 3,567,474 | 3/1971 | Malden . |
| 3,589,922 | 6/1971 | Asdell et al. . |
| 3,616,900 | 2/1971 | Cecil et al. . |
| 3,635,744 | 1/1972 | Malden . |
| 3,655,038 | 4/1972 | Mercade . |
| 3,655,417 | 4/1972 | Chapman . |
| 3,661,515 | 5/1972 | Iannicelli et al. . |
| 3,674,558 | 7/1972 | Malden . |
| 3,861,934 | 1/1975 | Mallary et al. . |
| 4,781,298 | 2/1988 | Hemstock et al. . |
| 4,935,391 | 6/1990 | Caropreso et al. . |
| 5,145,814 | 9/1992 | Willis et al. . |

FOREIGN PATENT DOCUMENTS

| | | |
|---|---|---|
| 1264190 | 2/1972 | European Pat. Off. . |
| 1474554 | 3/1977 | European Pat. Off. . |
| 2125685 | 2/1971 | France . |

Primary Examiner—Anthony Green
Assistant Examiner—Michael Marcheschi
Attorney, Agent, or Firm—Inez L. Moselle

[57] ABSTRACT

An improved method for improving the brightness of clay of the type that is capable of being bleached by an oxidative reagent such as Georgia gray kaolin. Such clay, in the form of a dispersed slurry, is treated with a combination of sodium silicate, sodium hypochlorite and ozone, most preferably followed by magnetic purification and a reduction bleach. Sodium hypochlorite is added shortly before ozonation.

8 Claims, No Drawings

METHOD FOR BLEACHING KAOLIN CLAY

This invention relates to an improved method for increasing the brightness of clay of the type that is capable of being bleached by an oxidative reagent. More specifically, the invention relates to bleaching such clay in the form of a dispersed slurry with a combination of sodium silicate, sodium hypochlorite and ozone, most preferably followed by magnetic purification and a reduction bleach.

Small increases in the brightness of kaolin products (e.g., brightness increases of as little as ½% on the GE scale) may have an appreciable effect on the value of the product to the consumer. The costs associated with bleaching represent a substantial expense to operators of kaolins plants. The chemical cost of bleaching chemicals in a single large kaolin plant can exceed several million dollars per year. Reduction of bleach consumption is obviously of significant commercial value. Improved design of ozone generators would be a potential for achieving either enhanced utilization or higher brightness of bleached clay products when ozone is employed as a bleaching agent. However, capital costs may rule out this approach. Chemical means for effectuating the reactivity of bleaching chemicals in a kaolin plant must take into account the necessity for maintaining the kaolin in the form of a dispersed slurry of adequate concentration that remains fluid during certain processing steps and not introducing material that will adversely affect the rheology (i.e., viscosity) of the finished clay product. Corrosive chemicals or chemicals that leave potentially noxious residues in products or by-products streams must be avoided.

For over a half century the kaolin clay industry has been following the practice of bleaching kaolin clays with reducing bleaches such as hydrosulfite (dithionite) salts to provide clay products of increased brightness and value to the consumer. The bleached clays, in particular fine particle fractions of bleached clays, are most widely used by the paper industry for coating paper and paper board.

Not all kaolins, however, respond adequately to reduction bleaches. Certain unique deposits of kaolin clay have the potential to be the source of premium high brightness grades of coating clay or as blending clays by virtue of the ultrafine particle size of the kaolin. These clays are the type known in the art as "hard" kaolins or "gray" kaolins because of the distinctive gray color. They contain small amounts of carbonaceous impurities and have a high iron content. Generally, such kaolins do not respond satisfactorily, if at all, to the action of reducing bleaches absent pretreatment. Consequently, for many years vast reserves of potentially premium grades of kaolin were of limited use. Widespread utilization of these potentially premium grades of clays awaited the landmark discovery that the addition of an oxidant to an aqueous slurry of such clay prior to use of a conventional reducing bleach resulted in a significant improvement in brightness of this type of clay. This discovery is set forth in U.S. Pat. No. 3,353,668, Duke, assigned to a predecessor of the assignee of the subject patent application. The oxidants disclosed in the '668 patent are broadly defined as compounds containing molecularly available oxygen. Disclosed subgenus and species included potassium permanganate (preferred), oxygen gas, alkali bichromates, alkali chlorates, alkali chlorites, ammonium persulfate and soluble peroxides such as sodium and hydrogen peroxide. The patent broadly teaches that a combination of oxidizing agents can be used. The preferred treatment involves incorporating the oxidant into a slurry of clay to be bleached without addition of alkaline clay dispersants. Consistent with the preference for employing a nondispersed slurry is the expressed preference in the patent for a pH in the range of 2.5 to 5.0. At these low pH values, kaolins are normally flocculated, not dispersed.

Another seminal development in the bleaching of gray kaolins resulted from the subsequent discovery that ozone gas was an effective oxidative bleach for aqueous slurries of gray kaolin. This discovery was of considerable commercial importance because slurries of gray clay could now be effectively bleached on a commercial scale without requiring the oxidation-reduction sequence and without leaving noxious by-products originating in the preferred permanganate oxidant. Another advantage was that ozone did not adversely affect the rheology (viscosity) of the bleached clay product. See U.S. Pat. No. 3,616,900, Cecil, et. al. (1971), also commonly assigned with the subject application. The ozone bleach was preferably followed by a reduction bleach. Ozone treatment was said to be effective at pH values in the range of 2 to 11, preferably 7 to 9.

This invention was followed by a considerable effort by the kaolin industry to utilize ozone in various manners to bleach gray kaolins.

In U.S. Pat. No. 3,861,934, Mallary, et al., commonly assigned, the concept of preoxidizing kaolins before applying a reduction bleach was expanded to brightening kaolins contaminated with residues of flotation reagents. Species of oxidants are disclosed at col. 7, the paragraph beginning at line 40. Sodium hypochlorite and ozone are included in the listing of oxidants.

Use of ozone to bleach floated and unfloated grades of kaolin is also disclosed in U.S. Pat. No. 3,635,744, Malden. In U.S. Pat. No. 3,674,558, Malden, bleaching of clay with ozone is carried out while the clay is dry or substantially dry. U.S. Pat. No. 3,655,038, Mercade, commonly assigned with the subject application, is directed to an improvement in a process for increasing the brightness of kaolin clay by subjecting pulp of the clay to an oxidation treatment with ozone followed by froth flotation to remove colored impurities. The treatment, which utilizes a reagent to decrease the solubility of calcium ions, takes place after ozonation. Reagents are soluble oxides, hydroxides and carbonates. In col. 3, it is disclosed that ozone treatment results in a decrease in pH of the pulp which may be 9 before ozonation.

U.S. Pat. No. 4,935,391 (Caropreso, et al.) teaches the use of hydrogen peroxide prior to or simultaneously with ozone, using a kaolin slurry having a pH adjusted to a value in the range of 5 to 9.

The use of sodium hypochlorite as an oxidative bleach, such as proposed in U.S. Pat. No. 3,353,668 (supra), eventually became widespread in the kaolin industry. In this case, the oxidizing agent, sodium hypochlorite, was added to a clay slurry from the mine instead of adding the oxidant to previously refined kaolin. The reason for using sodium hypochlorite at this upstream portion of the kaolin processing is that long times are required for sodium hypochlorite to bleach clays. Addition of sodium hypochlorite at or near the mine site prior to transport of a kaolin slurry to a plant provided the required residence time for this bleach to react with and bleach the clay. Also, the long residence time minimized the amount of potentially undesirable hypochlorite present in downstream processing. U.S. Pat. No. 3,551,515 (Iannicelli et al) relates to a method for brightening kaolin clays by oxidation of the organics and simultaneous settling of contaminants and coarse clay particles. Sodium hypochlorite is among the oxidants disclosed. Prolonged contact between oxidant and the kaolin slurry was required. Numerous other patents disclose the use of sodium hypochlorite in bleaching clays.

THE INVENTION

We have discovered a simple and effective method for enhancing ozone utilization in kaolin plant. In accordance with this invention, small amounts of sodium silicate dispersant and sodium hypochlorite are incorporated into a previously dispersed fluid slurry of gray kaolin clay before ozone is bubbled into the slurry to bleach the clay. Sodium hypochlorite must be added substantially immediately before ozone is added. Sodium silicate is added before, simultaneously with, or subsequent to, addition of sodium hypochlorite. Depending upon the specific nature of the kaolin, as well as the relative proportions of sodium hypochlorite and ozone, ozone consumption is reduced or the bleached clay is brighter than it would be in the absence of the hypochlorite pretreatment. Optionally, the clay is purified in a magnetic separator before or after the hypochlorite/ozone treatment of the invention. Optionally, but preferably, the ozone treated clay is further bleached with a reducing bleach.

In contrast to the bleach technique of U.S. Pat. No. 3,353,668 (supra), the process of this invention requires use of a dispersed clay slurry. Also, our process is practiced using more dispersant than is necessary to disperse fully the clay, and both of our oxidants are added virtually simultaneously. An important advantage of the process of the invention over the bleach process of U.S. Pat. No. 4,935,391 is that we do not use hydrogen peroxide or a chemical that generates hydrogen peroxide. Hydrogen peroxide is a corrosive chemical. Obviously, corroded metal would be a serious problem in a plant producing bleached clay. In contrast to the prior commercial practice of using sodium hypochlorite as a bleach in kaolin operations with prolonged contact, we employ only small amounts of such material and it has only a short residence before the primary oxidant, ozone, is introduced. Minimal amounts (if any) of hypochlorite are present in the product or by-process streams.

DESCRIPTION OF PREFERRED EMBODIMENT

Clays amenable to the process of this invention are the carbon contaminated gray kaolins of the type mined in Georgia. Generally, these kaolins have a high iron content. These clays are well known in the industry. The description of these kaolins which appears in U.S. Pat. No. 3,353,668 (supra) is incorporated herein by cross-reference.

Typical wet processing of gray kaolins includes blunging, degritting, particle size classification, magnetic purification, ozone bleaching and, in some cases a reduction bleach. In all of these steps water is present with the kaolin; hence, the term wet processing. In many of the processing steps, e.g., fractionation, magnetic purification and ozone treatment, the kaolin water system is in fully dispersed fluid condition. Dispersion (deflocculation) is achieved by incorporating an appropriate dispersant or dispersant mixtures, typically soda ash, sodium silicate, sodium hydroxide and polyacrylate salt. The dispersant is required in order to achieve fluidity of the clay-water system at a commercially feasible clay solids content. For example, a 60% solids kaolin-water system may be a solid or semi-solid system when no dispersant is present. When sufficient dispersant is added, the mass is converted to a slurry that may have substantially Newtonian flow.

The clay solids content of dispersed slurries in various wet processing steps may be in the range of about 10 to 70%, usually 30 to 35%. Control of dispersion is essential for the effective operation of the fractionation, ozone bleaching and magnetic purification steps. The pH during the wet processing operations is from neutral to mildly alkaline. Reduction bleach, in contrast to the aforementioned processing, is carried out with acidic flocculated clay-water systems. The resulting filter cakes may then be dispersed, spray dried or formed into dispersed high solids slurries for shipment.

The process of this invention is versatile and may utilize a dispersed fluid clay slurry or a mixture of such slurries. Slurries discharged from various wet processing steps may be blended. For example, the dispersed slurries can be one or sized fractions discharged from particle size fractionation equipment such as centrifuges, beneficiated clay slurries from a flotation plant, product discharged from a magnetic separation device, any combination of slurries from operations, such as, for example, a mixture of magnetically purified and non-purified kaolin. The pH of these dispersed slurries is neutral to mildly alkaline, e.g., 7 to 9. These streams are well dispersed, i.e, they contain an amount of dispersant which suffices to form a clay-water system of minimum apparent viscosity.

In practicing this invention a dispersant grade of water soluble sodium silicate is employed. Dispersant grades of sodium silicate typically have $Na_2O:SiO_2$ molar ratios in the range of 1:2 to 1:3.3. N ® Brand and O ® Brand sodium silicate solution are examples of commercial available grades. Sodium silicate can be introduced before, simultaneously with or immediately after sodium hypochlorite is added. However, prolonged aging of a slurry containing the added sodium silicate may be undesirable because the dispersant can lose its effectiveness. Since a principal function of the dispersant is to improve the response of the clay to bleaching by ozone, it must be added before introduction of at least a major amount of the ozone, preferably before all ozone is introduced. Sodium silicate may be incorporated dry or preferably as an aqueous solution. It may be advantageous to dilute further commercial sodium silicate solutions to assure uniform mixing. Sodium silicate may be incorporated simultaneously with addition of a solution of sodium hypochlorite by means of an in-line mixer at ambient temperature in direct connection to the reaction chamber of the ozonation equipment. The amount of sodium silicate added is generally in the range of ¼ to 5#/ton, preferably 1 to 3 #/ton, and usually 1 to 2 #/ton. (As used herein, all quantities of materials are expressed on a dry weight basis and clay weight is expressed as short tons.) When insufficient sodium silicate is employed, the beneficial effects may be negligible. An excess may result in excessive flocculation which would be detrimental to the effectiveness of the ozone bleach as well as subsequent magnetic purification. The amount of sodium silicate added will effect a modest increase in pH of the slurry. For example, addition of an appropriate quantity of sodium silicate to the slurry will increase pH, typically about 8.5 to 9.2, by an amount in the range of about 0.1 to 0.5 pH units.

Sodium hypochlorite is preferably introduced as a dilute aqueous solution, for example a solution of 8 to 15% weight concentration. From ¼ to 10 #/ton, usually from ½ to 3 #/ton of clay, is used. It is desirable to minimize the quantity of sodium hypochlorite added because if excessive sodium hypochlorite is used some will survive the ozonation and potentially cause corrosion in downstream processing equipment. Additionally, excessive residual sodium ions can have a detrimental effect on final product viscosity, and subsequent reductive bleach can occur more quickly with reduced addition of reductive bleach and acid and/or alum.

Sodium hypochlorite should be added within an hour of the time ozone is added. Preferably, ozone is added within minutes, e.g., 15 minutes, or seconds of the hypochlorite addition. Prolonged aging of the slurry containing hypochlorite prior to introduction of ozone is to be avoided because the synergistic effect of the hypochlorite is reduced or eliminated as the sodium hypochlorite is consumed in its normal oxidative role. Sodium hypochlorite will normally increase pH by 0.1 to 0.5 pH units. Dispersion will not normally be affected significantly.

Ozone generators useful in practice of the invention are well known in the kaolin industry. Conventional or specialized ozone generation can be used to introduce ozone into a dispersed slurry of pretreated kaolin. Generally, from 0.1 to 5 #/ton, usually 0.5 to 3 #/ton and preferably 0.8 to 1.5 #/ton of ozone is used. Ambient temperature is suitable for the ozone treatment. As demonstrated in the accompanying illustrative examples, the presence of sodium silicate aids in effectiveness of the ozone bleach.

The fluid slurry discharged from the ozonation vessel is preferably purified by removal of colored discrete paramagnetic impurities (principally iron-bearing titania). Conventional operation of high gradient magnetic separation units (HGMS) is described in U.S. Pat. No. 4,781,298, Hemstock, et al. These separators are also known as HIMS separators (high intensity magnetic separators). An improved method for operating HGMS units is the subject of the '298 patent. Conventional or improved HGMS separators can be employed for the magnetic separation step. Cryogenic separators can also be used. It should be noted that presence of added sodium silicate in the system eventually fed to the magnetic separator facilitates removal of paramagnetic colored bodies in the separator, thereby further increasing the brightness of the clay. Thus, the added sodium silicate has a benefit in downstream processing as well as during ozonation.

The dispersed magnetically purified slurry is then preferably flocculated and bleached with a hydrosulfite bleach, usually sodium hydrosulfite. The in situ bleach procedure of U.S. Pat. No. 5,145,812, Willis, et al. can be employed. The reduction bleach usually will further increase brightness. Even if brightness is not increased significantly, shade will be improved (yellowness is decreased). Reduction bleaching can be carried out without intermediate magnetic purification if desired.

The invention may be more fully understood from the following illustrative examples.

The method of the invention was tested in a pilot plant facility utilizing clay-water suspensions (slurries) of gray kaolins currently being mined from selected gray clay horizons of the Dixie kaolin mine, located in Wilkinson County, Ga., and wet processed in Engelhard Corporation's commercial facilities. This wet-processing entailed blunging the crude kaolin with water and dispersant, degritting the slurry of sand and other oversized material with drag boxes and screens, and the separation of the slurries into one or more particle size fractions by continuous centrifuges. In each of the examples the gray kaolin slurry subjected to the treatments described therein was a batch withdrawn from a particular production-line process stream which is a blend of gray kaolin slurries. The experiments described in the examples were conducted over a period of several months, so the slurry batch withdrawals were not of identical physical parameters, but were substantially similar, and within the limits of variations typical of production line process streams, which are controlled by statistical process quality controls to maintain the consistency of physical parameters. This gray kaolin slurry contained gray kaolin, water and about 0.2 to 0.6 weight percent dispersant, a mixture of soda ash, sodium hydroxide, sodium silicate and polyacrylate dispersants and was well dispersed. The GE brightness (prior to the processing described in the examples) was about 81-84%.

In the examples, magnetic separation was conducted with a commercial high intensity magnetic separator (Siliconel Model 805). Ozonation was conducted in a pilot scale Welsbach ozonation unit which is essentially a closed stirred five gallon container. Ozone was bubbled into gray kaolin slurry contained in the ozonator column at a rate of 2.0 liters per minute, at a pressure of 8 pounds per square inch. The sodium hypochlorite was a commercially available solution of about 10% concentration. The sodium silicate solution was N® Brand from Power Silicates which contains approximately 34% solids and has a $Na_2O/SiO_2$ molar ratio of about 1:3.2. Reductive bleach was K Brite® dry sodium dithionite bleach from Virginia Chemical.

As is conventional in the industry, the addition levels of the solutions to the slurry are reported on a dry basis; that is, dry pounds of (100% active) chemical per dry short ton of clay. Initial mixing of the kaolin slurry with these solutions was carried out in a five gallon bucket, and was followed by 15 minutes of low shear mixing utilizing a drill press at 850 RPM. Brightness measurements were performed using the TAPPI standard method, T524, and were reported as "GE brightness" or "GEB values".

EXAMPLE 1

This example demonstrates that a pretreatment of 1-4 pounds sodium hypochlorite per ton kaolin admixed with the gray kaolin slurry for approximately 15 minutes prior to ozonation achieved unanticipated benefits in the brightness of the ozone-treated kaolin slurry. Brightness levels achieved by ozonation alone, without the benefit of the pretreatment, were achieved by pretreated samples at a significantly lower ozone treatment level.

A gray kaolin slurry was charged, treated and discharged from the production line HGMS unit, with the discharge collected in a slurry storage tank. The magnet-treated slurry collected in the tank had a kaolin solids content of 29.2%, and the kaolin had a GE Brightness of 82.6%. In this example, all samples were withdrawn from the tank, treated and measured as described within four days of discharging the slurry from the production-line HGMS unit.

In a control test carried out to determine the effectiveness of a reductive bleaching without a preoxidation step, a slurry sample (100 milliliter) was withdrawn from the tank and an amount of sodium dithionite reductive bleach was admixed with the slurry sample in a conventional manner in an amount equivalent to 8 pounds of bleach per short ton. This reductive bleaching treatment improved the brightness of the kaolin to 83.4%, an improvement of 0.8% GEB.

To simulate conventional ozone processing, a control sample of five gallons of slurry, referred to as batch I, was withdrawn from the tank and charged directly to the ozonator. Slurry samples were withdrawn at 7.5, 17.5, 29.5, 45.0, 64.7 and 92 minutes after commencement of ozonation, corresponding to ozone addition levels of 0.18, 0.41, 0.69, 1.06, 1.52 and 2.18 pounds ozone per ton. The brightness of the contained kaolin in these samples withdrawn from the ozonator was determined in conventional manner. The results of this experiment are tabulated in Table 1. Note that addition of 1.52 pounds of ozone per ton resulted in a kaolin GE brightness of 85.8%, an improvement of 2.9% over the HGMS discharge stored in the tank.

In the next series of tests, a gray kaolin slurry batch, batch II (five gallons) was withdrawn from the tank and admixed with an amount of sodium hypochlorite solution (8.6% active) equivalent to 1.0 pounds of NaOCl per ton clay. The slurry and added sodium hypochlorite solution were immediately subjected to 15 minutes of low shear mixing with a drill press. Upon completion of this mixing, a portion of slurry was withdrawn; pH was 8.8 and the kaolin had a GE brightness of 84.4%. Immediately after mixing, the remainder of the sodium-hypochlorite treated slurry batch II was charged to the ozonator and treated with ozone gas in the manner described above. Slurry samples were withdrawn periodically to measure brightness of the sodium hypochlorite and ozone treated kaolin. The results are also tabulated in Table 1.

Data in Table 1 show that the pretreated slurry of batch II required only 0.94 pounds of ozone per ton to achieve a kaolin brightness of 85.9%; while, as noted above, slurry batch I, without the pretreatment, required 1.53 pounds of ozone per ton to achieve a slightly lower GE brightness.

In the next set of experiments, a slurry batch III was withdrawn from the tank and pretreated with sodium hypochlorite solution equivalent to 2 (two) pounds per ton kaolin. After mixing for 15 minutes, a small amount of slurry was withdrawn and tested; the pH was 8.9 and the kaolin had a GE brightness of 85.0%. After mixing, the remainder of batch III was immediately charged to the ozonator for ozone treatment. The results are reported in Table 1.

Data in the table show that pretreated slurry batch III required 0.87 pounds ozone per ton to achieve a kaolin GE brightness of 86.0%. Using data interpolation, unpretreated batch I would require about 1.96 pounds ozone to attain the same brightness.

In the next set of experiments, slurry batch IV was withdrawn from the tank and pretreated with 4 (four) pounds of sodium hypochlorite per ton kaolin. After mixing for 15 minutes, a small amount of slurry was withdrawn and tested; the pH was 9.2 and the kaolin achieved a GE brightness of 85.4%. The remainder of batch IV was immediately after mixing charged to the ozonator. The results are reported in Table 1.

Data in Table I show that pretreated slurry batch IV achieved a kaolin GE brightness of 85.7% with the addition of 0.50 pounds ozone, which is approximately the same brightness outcome that batch III achieved with less hypochlorite. Further, the data show that batch IV did not respond to additional ozonation; whereas batch III did respond to further ozonation. The data thus demonstrate that, under the conditions of the experiment, a 4.0 pound per ton pretreatment level of sodium hypochlorite was less effective than 2.0 pound.

TABLE I

Effect of Sodium Hypochlorite Pretreatment on GEB Values of Ozonator Discharge

| Batch # | I | II | III | IV | V | VI |
|---|---|---|---|---|---|---|
| Ozonator Feed GEB, % | 82.6 | 84.4 | 85.0 | 85.4 | 85.1 | 85.4 |
| Ozone Addition lbs./ton | | | GEB, % | | | |
| 0.18 | 83.1 | | | | | |
| 0.25 | | | | | 85.2 | 85.3 |
| 0.26 | | | | 85.5 | | |
| 0.27 | | | 85.4 | | | |
| 0.30 | | 85.1 | | | | |
| 0.41 | 83.4 | | | | | |
| 0.43 | | | | | | 85.4 |
| 0.44 | | | | | 85.3 | |
| 0.49 | | | 85.7 | | | |
| 0.50 | | | | 85.7 | | |
| 0.54 | | 85.4 | | | | |
| 0.69 | 84.3 | | | | | |
| 0.78 | | | | 85.7 | | |
| 0.87 | | | 86.0 | | | |
| 0.89 | | | | | 85.4 | |
| 0.90 | | | | | | 85.2 |
| 0.94 | | 85.9 | | | | |
| 1.06 | 84.7 | | | | | |
| 1.52 | 85.8 | | | | | |
| 2.18 | 86.1 | | | | | |

I Control, no pretreatment
II 1.0 lbs/ton hypochlorite pretreatment, 15 minutes
III 2.0 lbs/ton hypochlorite pretreatment, 15 minutes
IV 4.0 lbs/ton hypochlorite pretreatment, 15 minutes
V 2.0 lbs/ton hypochlorite pretreatment, 24 hours
VI 4.0 lbs/ton hypochlorite pretreatment, 24 hours

EXAMPLE 2

This example demonstrates that a gray kaolin slurry that received the 2.0 or 4.0 pound sodium hypochlorite pretreatment 24 hours prior to ozonation achieved some brightness enhancements, as compared to conventional ozone processing, but the improvement was small compared to the results achieved in Example 1, wherein the pretreated slurry was immediately charged to the ozonators after mixing.

Slurry batch V received a pretreatment of 2 (two) pounds of sodium hypochlorite per ton kaolin, followed by 15 minutes of mixing. The batch was then stored in a closed bucket. After 24 hours of storage, a small amount of slurry was withdrawn from batch V; the slurry pH was 8.9 and the kaolin had a GE brightness of 85.1. The remainder of slurry batch V was directly charged to the ozonator, and ozone-treated as described above. At periodic intervals, slurry was withdrawn from the ozonator and tested, with the results reported in Table 1. Slurry batch VI was subjected to the same conditions as batch V, with the difference that this batch received a pretreatment of 4 pounds of sodium hypochlorite per ton kaolin. Results are also reported in Table 1.

Batch V after ozone treatment with 0.89 pounds ozone per ton kaolin, achieved a GE brightness of 85.4%. With the same level of pretreatment, batch III achieved the same 85.4% brightness level with only 0.27 pounds of ozone. Using data interpolation, batch I, without pretreatment, would have required about 1.35 pounds of ozone to achieve the same brightness level as batch V. Also shown by the data is that, over the range of ozone treatment to which it was subjected, the brightness response of batch V to ozonation was 0.3%. Batch VI, pretreated with 4 pounds per ton sodium hypochlorite, was unresponsive to ozonation; all batch VI brightness enhancements were achieved as a consequence of the hypochlorite addition.

EXAMPLE 3

This example demonstrates that particularly advantageous unanticipated, brightness enhancements of the ozone-treated slurry are achieved if an effective amount of sodium silicate solution is combined with sodium hypochlorite in the pretreatment.

A gray kaolin slurry was charged, treated and discharged from a production-line HGMS unit. The magnet-discharge was collected in a storage tank. This magnet-treated gray kaolin slurry stored in the tank had a kaolin solids content of 25.5%, a pH of 8.4, and the kaolin had a GE Brightness of 83.4%. In this example, all samples were withdrawn from the tank, treated and measured as described within two days of discharging the slurry from the HGMS unit.

A slurry sample (100 milliliters) was withdrawn from the tank and an amount of sodium dithionite reductive bleach equivalent to 8 pounds of bleach per ton kaolin was admixed with the slurry. The reductive bleaching treatment improved the brightness of the kaolin to 84.1%, an improvement of 0.7% GEB.

To simulate conventional ozone processing of this gray kaolin slurry, a five gallon control sample, referred to as batch I, was withdrawn from the tank and charged directly to the pilot scale ozonation unit. Under the conditions described above, the slurry was ozone-treated, with slurry withdrawn at periodic intervals for determination of kaolin brightness. The results of this experiment are tabulated in Table 2. Note that this slurry (without pretreatment) responded to increased ozone treatment over the range to which it was subjected. The highest ozone treatment, equivalent to 1.53 pounds of ozone per ton clay, resulted in a kaolin GE brightness of 86.3%, an improvement of 2.9% over the HGMS discharge stored in the tank.

In the next series of tests, another gray kaolin slurry batch (batch II) was withdrawn from the tank and mixed with an amount of sodium silicate dispersant solution (N ® Brand) equivalent to 0.5 pounds of sodium silicate per ton kaolin. After mixing for 15 minutes, an amount of slurry was withdrawn and measured as having a slurry pH of 8.4 and with the contained kaolin having a GE brightness of 83.0%. The remainder of slurry batch II was, immediately after mixing, charged to the ozonator unit and treated with ozone gas, as above. Slurry sample was withdrawn periodically to measure brightness of the sodium-silicate-and-ozone-treated kaolin; the results are also tabulated in Table 2.

The data in Table 2 indicate that the addition of sodium silicate dispersant prior to ozone treatment (without the addition of sodium hypochlorite) provided no brightness enhancements as compared to the Control case (batch I).

In the next series of tests, the conditions of Example 1 above were replicated. A slurry batch (batch III) was withdrawn from the tank and mixed with an amount of sodium hypochlorite solution (8.4% active) equivalent to 1.0 pounds per ton kaolin. After mixing for 15 minutes, a slurry sample was withdrawn and measured as having a pH of 8.4 and with the contained kaolin having a GE brightness of 84.7%. The remainder of batch III was, immediately after mixing, charged to the ozonator and ozone treated. Slurry samples were withdrawn and brightness measured, and as tabulated in Table 2.

Similar to the results of Example 1, the benefits of sodium hypochlorite pretreatment are demonstrated in that batch III required only 0.87 pounds of ozone per short ton to achieve a kaolin brightness of 86.5%; while, as noted above, slurry batch I, which did not receive the pretreatment, required 1.53 pounds of ozone per short ton to achieve a slightly lower 86.3% GE brightness. Further note that, within the experimental range, increasing the level of ozonation level of slurry batch III beyond the 0.87 pounds per ton amount did not further increase brightness.

In the next set of experiments, a slurry batch IV was withdrawn from the tank and mixed with amounts of sodium hypochlorite and sodium silicate solutions equivalent to 1.0 pounds and 0.5 pounds per ton kaolin, respectively. Sodium silicate was added first and the sodium hypochlorite was added immediately thereafter, whereby additions were essentially simultaneous. After mixing for 15 minutes, a small amount of slurry was withdrawn and tested; the pH was 8.5 and the kaolin achieved a GE brightness of 84.6%. The remainder of the sodium hypochlorite and sodium silicate pretreated gray kaolin slurry batch IV was charged to the ozonator for ozone treatment, as above, with the results reported in Table 2.

The data show that pretreated slurry batch IV achieved a kaolin brightness of 86.8% with 0.81 pounds ozone; that is, batch IV required 0.72 pounds per tons less ozone to achieve a 0.5% higher GEB than unpretreated batch I. Additional ozonation of slurry batch IV, above the 0.81 pounds per tons level, did not result in any additional brightness response. The synergistic benefit of the addition of the sodium silicate solution is demonstrated in that the sodium hypochlorite plus sodium silicate pretreated batch IV achieved about 0.3–0.4% higher GEB value than batch III at equivalent levels of ozone treatment. It has previously been demonstrated that a pretreatment consisting of sodium silicate only (batch II) had no brightness benefit as compared to the control batch I.

In the final experiment of this example, the pretreatment level for a slurry batch V was increased to 1.0 pound sodium hypochlorite and 1.0 pound sodium silicate per ton. After mixing, the pretreated sample had a brightness of 85.0%. The remainder of the batch was then ozone treated. Note that with the first slurry withdrawal from the ozonator, equivalent to ozone treatment with 0.29 pounds ozone per ton, the kaolin of batch V achieved a brightness of 86.7%; and did not respond further to higher levels of ozone addition. The 86.7% brightness is a commercially significant brightness enhancement compared to the 86.3% result achieved by the batch I sample with no pretreatment after 1.53 pounds per ton ozone treatment.

TABLE II

Effect of Sodium Hypochlorite and/or Sodium Silicate Pretreatment on GEB Values of Ozonator Discharge

| Batch # | I | II | III | IV | V |
|---|---|---|---|---|---|
| Ozonator Feed GEB, % | 83.4 | 83.0 | 84.7 | 84.6 | 85.0 |
| Ozone Addition lbs./ton | GEB, % | | | | |
| 0.29 | | | | | 86.7 |
| 0.40 | | | | 85.9 | |
| 0.44 | | | 85.6 | | |
| 0.49 | | 84.5 | | | |
| 0.52 | 85.1 | | | | |
| 0.57 | | | | | 86.6 |
| 0.81 | | | | 86.8 | |
| 0.86 | | | | | 86.7 |
| 0.87 | | | 86.5 | | |
| 0.99 | | 85.8 | | | |
| 1.03 | 85.8 | | | | |
| 1.21 | | | | 86.8 | |
| 1.33 | | | 86.4 | | |
| 1.48 | | 86.2 | | | |
| 1.53 | 86.3 | | | | |

I Control, no pretreatment
II 0.5 lbs/ton sodium silicate pretreatment
III 1.0 lbs/ton sodium hypochlorite pretreatment
IV 1.0 lbs/ton sodium hypochlorite + 0.5 lbs/ton sodium silicate
V 1.0 lbs/ton sodium hypochlorite + 1.0 lbs/ton sodium silicate

EXAMPLE 4

In conventional ozone processing, ozonator-discharge slurry is optionally subjected to bleaching with a reductive bleach, such as sodium dithionite, to enhance brightness and shade characteristics. In this example sodium hypochlorite and/or sodium silicate pretreated gray kaolin slurries were subjected to post-ozonation reductive bleaching. The data reported in Table 3 demonstrate that the brightness enhancements achieved by the pretreatment combined with ozonation, noted in Example 3, were maintained when the post-ozonation reductive bleaching treatment was added.

To demonstrate the embodiment of the invention in which post-ozonation reductive bleaching is practiced, slurry samples from batches I, II, III and IV of Example 3 above were, after the completion of the ozone treatments, further treated, in a conventional manner, with the addition of an amount of sodium dithionite reductive bleach equivalent to 8 pounds per ton kaolin. Reductive bleaches were carried out within 3 to 5 hours or overnight after ozone treatment. The slurry sample from each batch subjected to the reductive bleach treatment was the slurry sample with the highest addition level of ozone. The results of this reductive bleach treatment are reported in fifth data column of Table 3, below; data columns 1–4 summarize the results reported in Table 2 and described in Example 3, above.

TABLE 3

Effect of Pretreatment, Ozonation and Reductive Bleaching on GEB Values

| | Pretreatment | | Ozone #/ton | GEB Step 1 + 2 | GEB Step 1 + 2 + 3 |
|---|---|---|---|---|---|
| | #/t NaOCl | #t silicate | | | |
| Batch I | 0 | 0 | 1.53 | 86.3 | 87.2 |
| Batch II | 0 | 0.5 | 1.48 | 86.2 | 87.0 |
| Batch III | 1 | 0 | 1.33 | 86.4 | 87.4 |
| Batch IV | 1 | 0.5 | 1.21 | 86.8 | 88.0 |

Step 1: Pretreatment
Step 2: Ozonation
Step 3: Post-ozonation treatment with 8 pounds sodium dithionite (K-brand) reductive bleach per ton.

Data in Table 3 show that Batch I, which simulates conventional ozone processing, achieved brightness of 86.3% with 1.53 pounds per ton ozone and 87.2% with post-ozonation reductive bleaching, an improvement of 0.9% with the addition of reductive bleaching. Batch III, with a pretreatment of 1 pound per ton sodium hypochlorite, achieved a brightness of 86.4% with ozonation and 87.4% with post-ozonation reductive bleaching, an improvement of 1.0%. Batch IV, with a pretreatment comprising 1 pound sodium hypochlorite per ton and 0.5 pound sodium silicate per ton, achieved a brightness of 86.8% with ozonation; and 88.0% post-ozonation reductive bleaching, an improvement of 1.2 points in brightness. Thus the data demonstrate that pretreatments with sodium hypochlorite, and sodium hypochlorite plus sodium silicate were compatible with post-ozonation reductive bleaching, and that the brightness advantages of the pretreatments are further enhanced by post-ozonation reductive bleaching.

EXAMPLE 5

Due to a processing plant configuration, it may be desirable to practice magnetic separation of paramagnetic impurities after the ozonation and, optional, reductive bleaching of the gray kaolin slurry, rather than prior to these processing steps, as was described in the previous examples. This example compares the brightness results of the practice of the invention using the alternative processing sequences. The data demonstrate that at the same pretreatment addition levels of sodium hypochlorite and sodium silicate, the brightness and remaining impurity levels of the end product of the processing were substantially the same for both alternatives.

A gray kaolin slurry, substantially similar to the slurry charged to the magnet in Examples 1 and 3 above, was stored in a tank. The slurry stored in the tank had a solids content of 33.2%, and a pH of 8.8. GE brightness was of the kaolin was 80.6% and iron and titanium impurity levels, as measured in a conventional manner with XRF were 2.67% $TiO_2$ and 0.92% $Fe_2O_3$. Five slurry batches were withdrawn from the tank; two batches were subjected to Process Sequence A comprising, in sequential order:

HGMS magnetic treatment; pretreatment; ozonation; reductive bleaching, and three batches were subjected to Process Sequence B comprising, in sequential order:

pretreatment; ozonation; HGMS magnetic treatment; reductive bleaching.

In both sequences, HGMS treatment comprised 45 TPH through the same HIMS and reductive bleaching comprised the addition of amount of sodium dithionite equivalent to 8 pound per tons kaolin.

Pretreatment of these five slurry batches comprised one pound sodium hypochlorite per ton plus either one, or two or three pounds per ton sodium silicate. The batches were designated A1, A2, B1, B2, B3 to signify the Process Sequence A or B and the amounts of sodium silicate in the pretreatment. Ozone additions varied from 1.15 to 1.26 pounds ozone per ton. Table 4 below reports the treatment variables and the brightness and impurity levels of the five batches attained after completion of the process sequences; that is, after reductive bleaching. The data demonstrate that, at the same pretreatment levels the brightness and impurity reductions achieved are substantially the same for both process alternatives. The data also demonstrate that increasing the amount of sodium silicate resulted in a desirable reduced amount of TiO2 impurity remaining in the end product.

TABLE 4

Effects of Alternate Process Sequences on GEB Values and Impurity Levels

| Process Sequence | A | | B | | |
|---|---|---|---|---|---|
| Batch | A1 | A2 | B1 | B2 | B3 |
| Pretreatment | | | | | |
| #/t silicate | 1 | 2 | 1 | 2 | 3 |
| #/t NaOCl | 1 | 1 | 1 | 1 | 1 |
| Ozone Amount #/t Ozone | 1.26 | 1.24 | 1.15 | 1.17 | 1.21 |
| End Product | | | | | |
| GEB, % | 86.3 | 86.5 | 86.2 | 86.6 | 86.9 |
| % TiO$_2$ (wt) | 1.86 | 1.77 | 1.82 | 1.77 | 1.72 |
| % Fe$_2$O$_3$ (wt) | 0.88 | 0.90 | 0.87 | 0.84 | 0.84 |

Process Sequence A = Magnet:Pretreatment:Ozonation:Reductive Bleach
Process Sequence B = Pretreatment:Ozonation:Magnet:Reductive Bleach

We claim:

1. In a method for oxidative bleaching gray kaolin clay with ozone, the improvement which comprises: adding about 0.25 to about 5 pounds of sodium silicate per ton clay and about 0.25 to about 10 pounds of sodium hypochlorite per ton clay to a dispersed aqueous slurry of gray kaolin clay and within an hour of adding said sodium hypochlorite incorporating a bleach-effective quantity of ozone into said slurry and recovering bleach kaolin clay.

2. The method of claim 1 wherein the amount of sodium hypochlorite added is sufficient to result in bleached kaolin clay having a higher brightness than the recovered kaolin clay would have in the absence of adding said sodium hypochlorite using the same amount of ozone.

3. The method of claim 1 wherein the amount of ozone incorporated into said slurry is less than the amount that would be needed to result in recovered kaolin having the maximum brightness attainable by use of ozone in the absence of said sodium hypochlorite.

4. The method of claim 1 wherein the amount of ozone is in the range of 0.1–4 pounds per ton of clay.

5. The method of claim 1 wherein said sodium silicate is added to said slurry in amount such that the total quantity of dispersant in said slurry is in excess of that required to achieve minimum viscosity.

6. The method of claim 1 wherein said sodium silicate and sodium hypochlorite are added to said slurry substantially by an in-line mixer immediately before adding ozone to said slurry.

7. The method of claim 1 wherein the amount of ozone is in the range of 0.5–3 pounds per ton of clay.

8. The method of claim 1 wherein the amount of ozone is in the range of 0.8–1.5 pounds per ton of clay.

* * * * *